J. F. GILMORE.
REWINDING DEVICE FOR MOVING PICTURE MACHINES.
APPLICATION FILED JUNE 23, 1913.

1,215,364.

Patented Feb. 13, 1917.
5 SHEETS—SHEET 1.

J. F. GILMORE.
REWINDING DEVICE FOR MOVING PICTURE MACHINES.
APPLICATION FILED JUNE 23, 1913.

1,215,364.

Patented Feb. 13, 1917.

Witnesses:
Inventor:

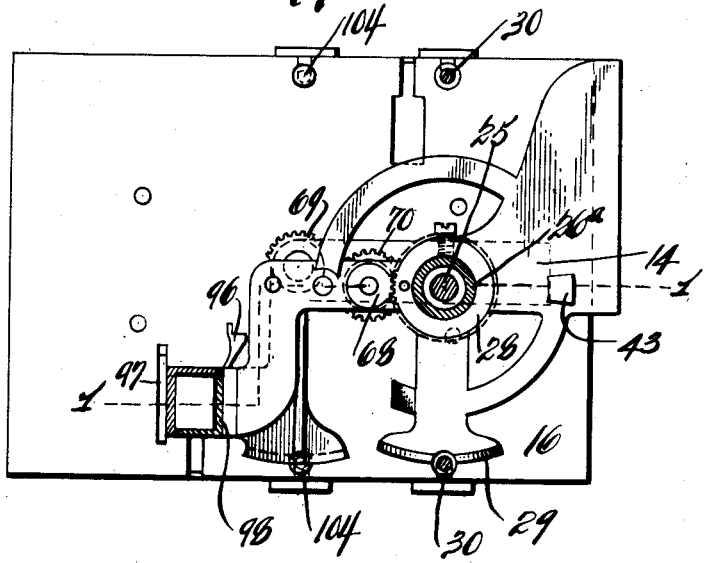
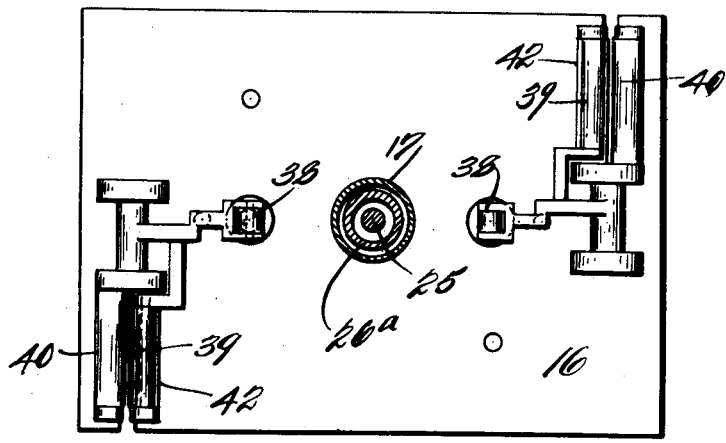

J. F. GILMORE.
REWINDING DEVICE FOR MOVING PICTURE MACHINES.
APPLICATION FILED JUNE 23, 1913.
1,215,364.
Patented Feb. 13, 1917.
5 SHEETS—SHEET 5.
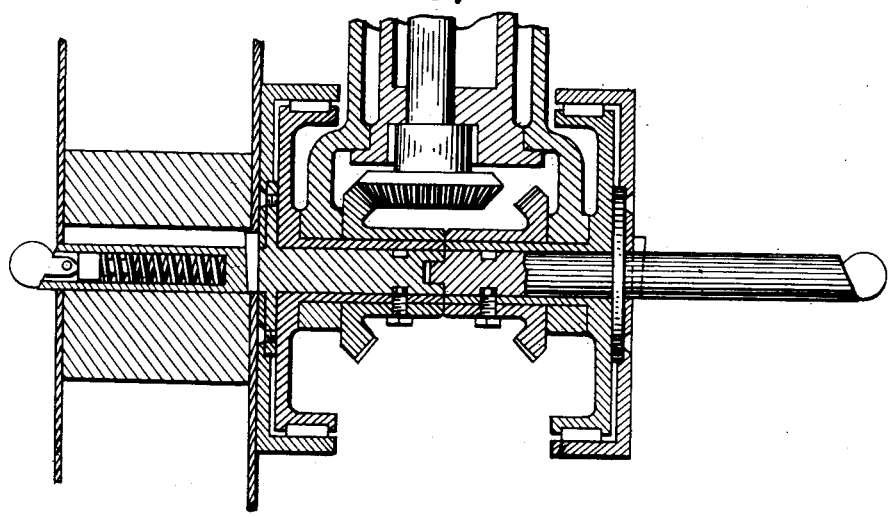
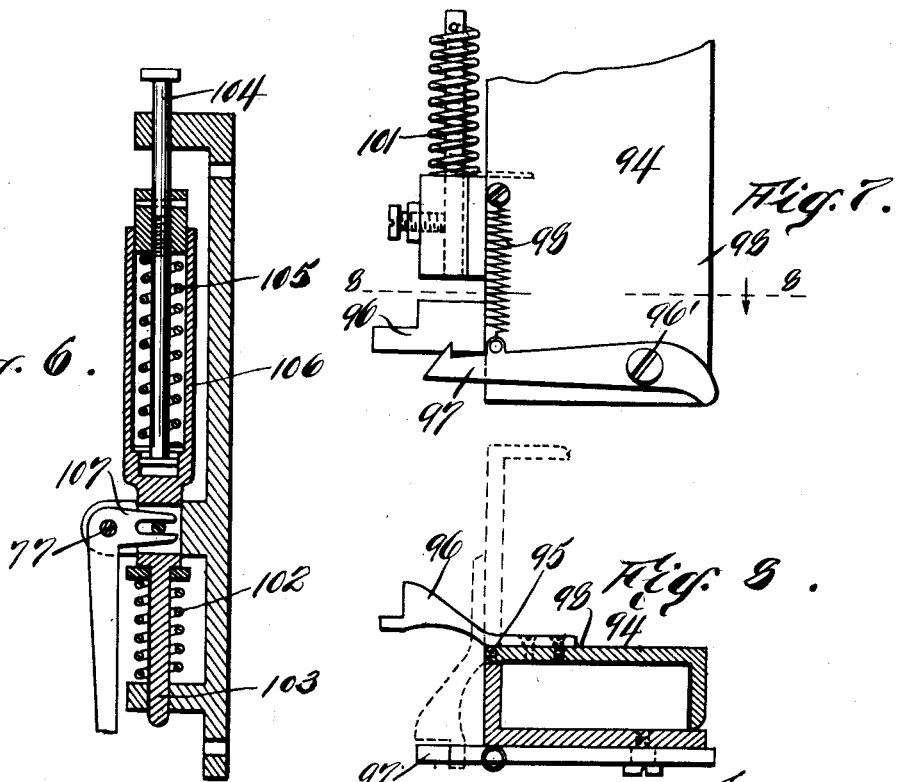

UNITED STATES PATENT OFFICE.

JOHN F. GILMORE, OF NEW YORK, N. Y.

REWINDING DEVICE FOR MOVING-PICTURE MACHINES.

1,215,364.   Specification of Letters Patent.   Patented Feb. 13, 1917.

Application filed June 23, 1913. Serial No. 775,228.

*To all whom it may concern:*

Be it known that I, JOHN F. GILMORE, a citizen of the United States, residing at New York city, in the county and State of New York, have invented certain new and useful Improvements in Rewinding Devices for Moving-Picture Machines, of which the following is a clear, full, and exact description.

This invention relates to a machine for the rewinding of moving picture films by the same operation as exhibits the film in the projecting machine.

The object of the invention is to provide an attachment for ready manipulation and ready adjustment to existing machines and which will eliminate fire hazard, and will permit the rewinding of a projected film by the same movement on the part of the operator as he exerts in exhibiting another film to an audience.

In carrying out my invention, I provide the projecting machine with a pair of let-off and a pair of take-up reels, one of each pair preferably above the optical axis, and one pair preferably below the optical axis, and I arrange such reels that the film from one upper and to one lower reel will be in line with the optical axis and film of the other pair will be at one side of such optical axis, but that both pairs of reels will be suitably connected and operated by the operating mechanism, so that an exhibited film will be unwound from its take-up film and rewound preferably overhead by the very operation of showing a succeeding film after which operation the rewound film and reel can be removed, and a fresh reel put in place, the attachment rotated and the projecting of the new film will act to wind up the other film then left in the machine. I connect both pairs of reels by suitable swinging supports, so that the mere turning of one reel into position will necessitate the proper positioning of the other three reels for the purpose of carrying out the operations of the machine.

I also provide a fire-proof channel for the film to traverse in traveling from a lower take-up reel to an upper rewinding reel, and I automatically operate such channel so that the mere rotation of one of the reels into position for exposure will cause the film being rewound to move into such channel, and to be there protected from fire risk.

The scope of the invention will be pointed out in the claims.

In the accompanying drawings:

Fig. 4 is a sectional view on line 4—4 Fig. 1.

Fig. 5 is a sectional view on line 5—5 Fig. 1.

Fig. 6 is a detail of the disk operating friction device for putting a strain on the take-up reel when the film is being dragged from such reel.

Fig. 7 is a fragmentary side elevation of the lower part of the film embracing channel.

Fig. 8 is a section on line 8—8 on Fig. 7.

Fig. 9 is a detailed central sectional side elevation of the take-up clutch, which is also shown in a co-pending application of mine bearing filing date April 10th, 1913, Serial No. 760,166.

Figure 1:
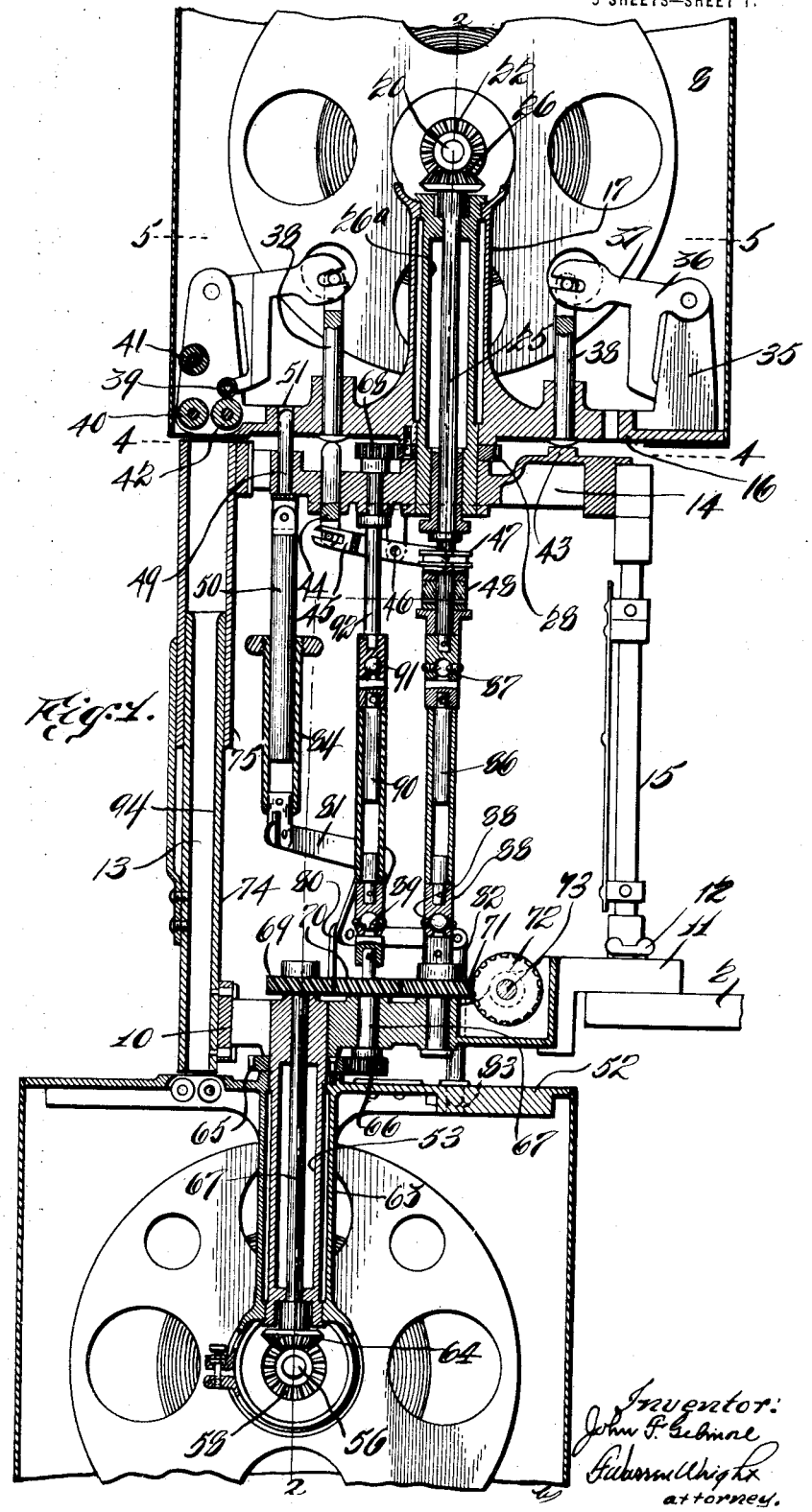
Figure 1 is a sectional side elevation on line 1—1 Fig. 4.

As shown in the drawings, 1 is the ordinary projecting machine mounted on a base 2, and provided with an operating handle 3, which, as is well known, is connected by suitable gearing to the film operating mechanisms, which in part include the shaft 4, on which a sprocket 5 is mounted, and which serves to communicate motion by a chain 6 to the drive sprocket 7 of the attachment of this invention.

The device of this invention consists of a top and bottom film box 8 and 9, mounted on a frame 10, which is fastened to the support 2 of the projecting machine by the lug 11, and fastened securely by attachment screws 12. The frame 10 serves to carry the channel device 13 to which is attached at the top a cam block 14 secured at one end to the upper part of the rod 15, which may be a part of the projecting machine proper, to which it may be secured by the thumb screw 15' shown in Fig. 3. The channel 13 and all other parts joining the frame 10 and cam block 14 are adjustable vertically so that the same may be adjusted to any existing machine.

Figure 2:
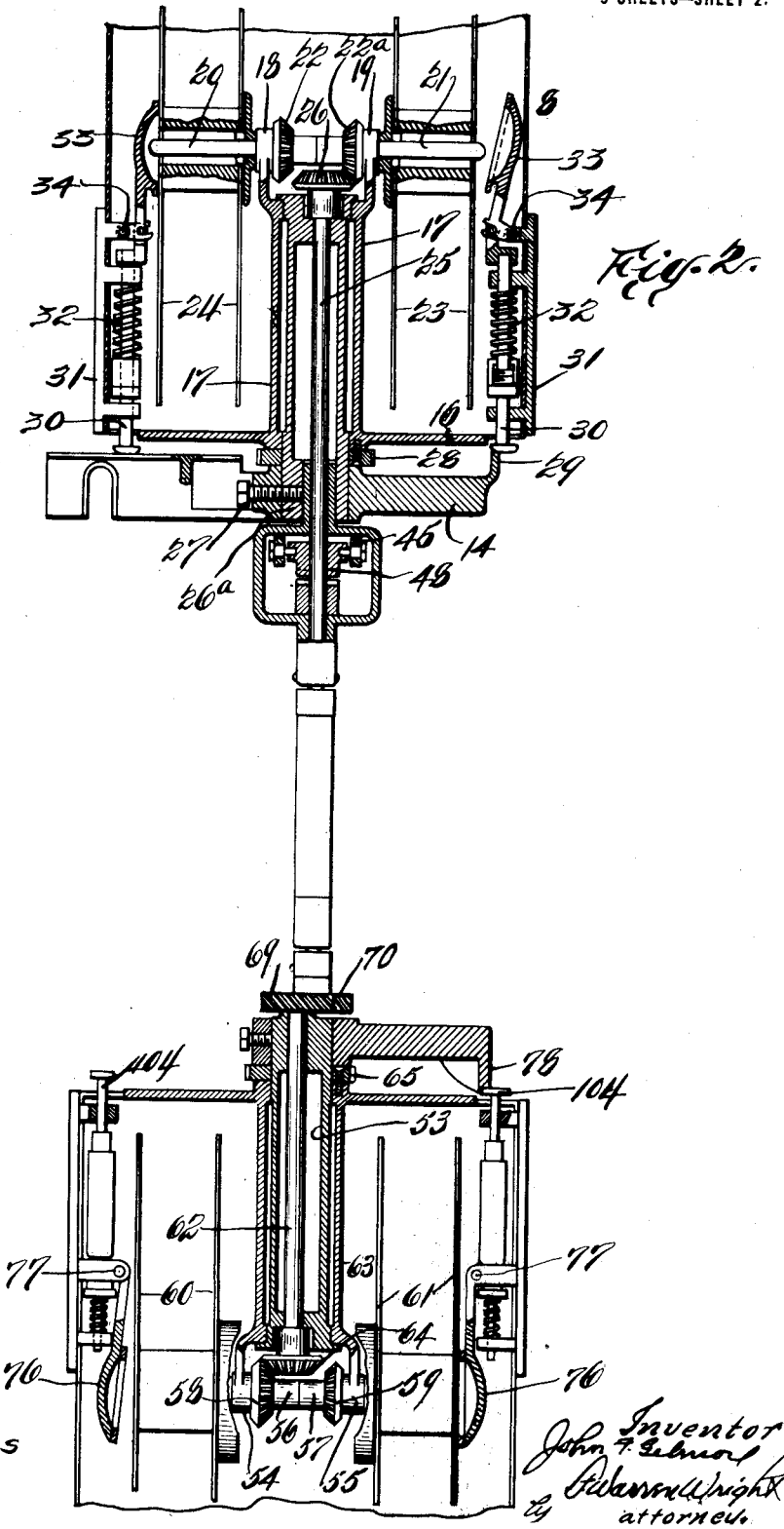
Fig. 2 is a sectional side elevation through the reel shafts of each box, on line 2—2 Fig. 1.

The box 8 is provided with a base 16, hich has a tubular extension 17 carrying bearings 18, 19. In the bearings there are provided shafts 20 and 21, provided with beveled gears 22 and 22ª, both of which shafts are free for rotation. Reels 23—24 of ordinary construction are adapted to fit on said shafts. Through the tubular extension 17 eccentrically mounted in the tube 26ª is a shaft 25 carrying a gear 26 adapted to mesh with one of the beveled gears 22. The shaft 25 is mounted in a stationary sleeve 26ª which is concentric with the tube 17, but eccentric to the shaft 25. The sleeve 26ª is fastened by a set screw 27 to the cam block 14, which also acts as the attaching means for securing the device to the projecting machine proper. A gear 28 pinned to the base of the box is adapted on operation to rotate the box and cause the positioning of the films and also the engagement of the driving pinion 26 with either one of the gears 22 or 22ª. The cam block 14 has an upstanding cam 29 adapted to operate on a stud 30 carried by the inclosing cover 31 of the box, to compress a spring 32, and lift a friction disk or cup 33, which is pivoted at 34 away from a reel. When the cam 29 is not acting upon a stud 30 the spring will force the friction cups 33 against the reel and tend to retard its rotation. Two sets of friction cups 33 are provided on opposite sides of the machine as shown in Fig. 2, one of which during operation is always in place; the other one is free. The upper box 8 also carries on its base an upstanding bracket 35 duplicated on each side and provided with a lever 36 with a bifurcated end engaging a stud 37 on a vertically reciprocating pin 38. The lever 36 carries at its lower end a roller 39 which acts in conjunction with rollers 40, 41 and 42 upon the film in a manner hereinafter described. The cam block 14 carries a raised cam section 43 which normally holds the rollers in the position shown in Fig. 1, but the roller 39 which is engaged by the film being rewound has under its influence a pin 44 passing through the cam block 14, and engaging one end of a bifurcated lever 45 pivoted at 46, and engaging at its other end a clutch collar 47, which is adapted on operation to lift a friction clutch member 48 to remove all strain or tendency to rotate from the shaft 25 so that upon a breaking of the film which is passed in front of the roller 39, the arm 36 will drop and stop the driving of the shaft 25, and hence prevent the winding up of a reel when the film is broken.

The cam block 14 carries a reciprocating pin 49 operated by a rod 50, which pin 49 is adapted to enter a registering recess 51 in the base of the box 8 to hold it in accurate register for whichever reel may be in place.

The lower box 9 is in many respects similar to the upper box. It has the base 52, the downwardly extending tubular part 53 carrying bearings 54—55 in each of which there freely rotates a shaft 56—57 with beveled gears 58—59, each adapted to carry a reel 60 and 61. A shaft 62 eccentric to the tubular member 53 rotates in a stationary sleeve 63 and carries a gear 64 adapted to contact with one of the beveled pinions 58 or 59. A gear 65 on the tubular part 53 meshes with a gear 66 on a vertical shaft 67 which carries a gear at its upper end 68, which meshes with the gear 28 of the upper box. A diagonal gear 69 on the shaft 62 meshes with a loosely mounted diagonal gear 70 on the shaft 67 which in turn meshes with a diagonal gear 71 driven from a diagonal gear 72 on the shaft 73. The gears 69, 70 and 71 have the diagonal placing of the teeth to permit their engagement with the diagonal gear 72 on the shaft 73, which shaft, as before stated, receives its motion from the chain 6 and sprocket 7 from the operating mechanism of the projecting machine. The base 52 carries at one end the stationary side 74 of the channel 13, which slides in the stationary upper part of the channel 75, which is fast to the upper cam 14.

Friction cups 76 pivoted at 77 are provided of the description shown in Fig. 9 for putting a retarding friction on the reel 60 or 61, one at a time, and they are operated by the cam 78, which is stationary. The frame 10 is provided with standards 80, to which a bell crank lever 81 is attached, the lever at the end being joined to a pin 82 adapted to lock into a registering recess 83 in the top of the lower box while the other end of the lever 81 is fastened to the sleeve 84, which carries in adjusted rigid position the shaft 50, which controls the locking pin 51 for the upper box. A spring 85 tends always to force the registering pins into position. In order to unlock them the operator must lower the lever at the point marked A in Fig. 3, to permit a rotation of the boxes. The shaft 25 when clutched in position becomes a part of a vertical shaft 86 which is connected to one part of the clutch by a ball join 87, and to the shaft 88 which carries the gear 71 by a ball join 88, so that any rotation of the gear 71 will normally be transmitted to the shaft 25, and through the gears 70 and 69 to the shaft 62, of the lower box tending to rotate one reel of both upper and lower box on opposite sides. The gear 66, which normally engages the gear 65, which is secured to the box to turn with it, is mounted on a shaft 67, which is connected by a ball join 89 with an adjustable sleeve 90, ball join 91 and upper shaft 92 to the gear 93 in mesh with the gear 28, which is carried with the upper box so that upon any movement of the upper box after the locking pins 83 and 51 are disengaged will make a corresponding movement to both boxes through this set of gearing. The channel 13 is provided with a hinged flap 94, as shown particularly in Figs. 7 and 8. The hinged flap as shown in Fig. 1 is composed of two sections slidably adjustable one with the other as is also the other part of the channel. The portion 98 is pivoted at 95 and carries an outstanding arm 96, which, when placed in the position of dotted lines, Fig. 8, will be latched under one end of a latch 97, pivoted at 96' to the stationary part of the channel, which latch is under the tension of a spring 98, so that on the nose end of the latch 99 being raised by a pin 100 (see Fig. 1), the latch will be released, and a spring 101 normally tending to close the flap 94 will close the same to protect the films inside the device. At the right period of the operation, the operator may normally open the flap 94, or it may be done automatically by a cam on the stationary part 10. The cup 76 which is pivoted at 77, and is shown in detail in Fig. 6, is normally operated upon by a spring 102, surrounding a rod 103 to hold the cup off the reel, but upon the cam 78 striking the rod 104 a spring 105 is compressed and upon further motion the chamber 106 which engages the arm 107 of the lever, which carries the cup 76, is depressed to apply friction to a reel.

Figure 3:
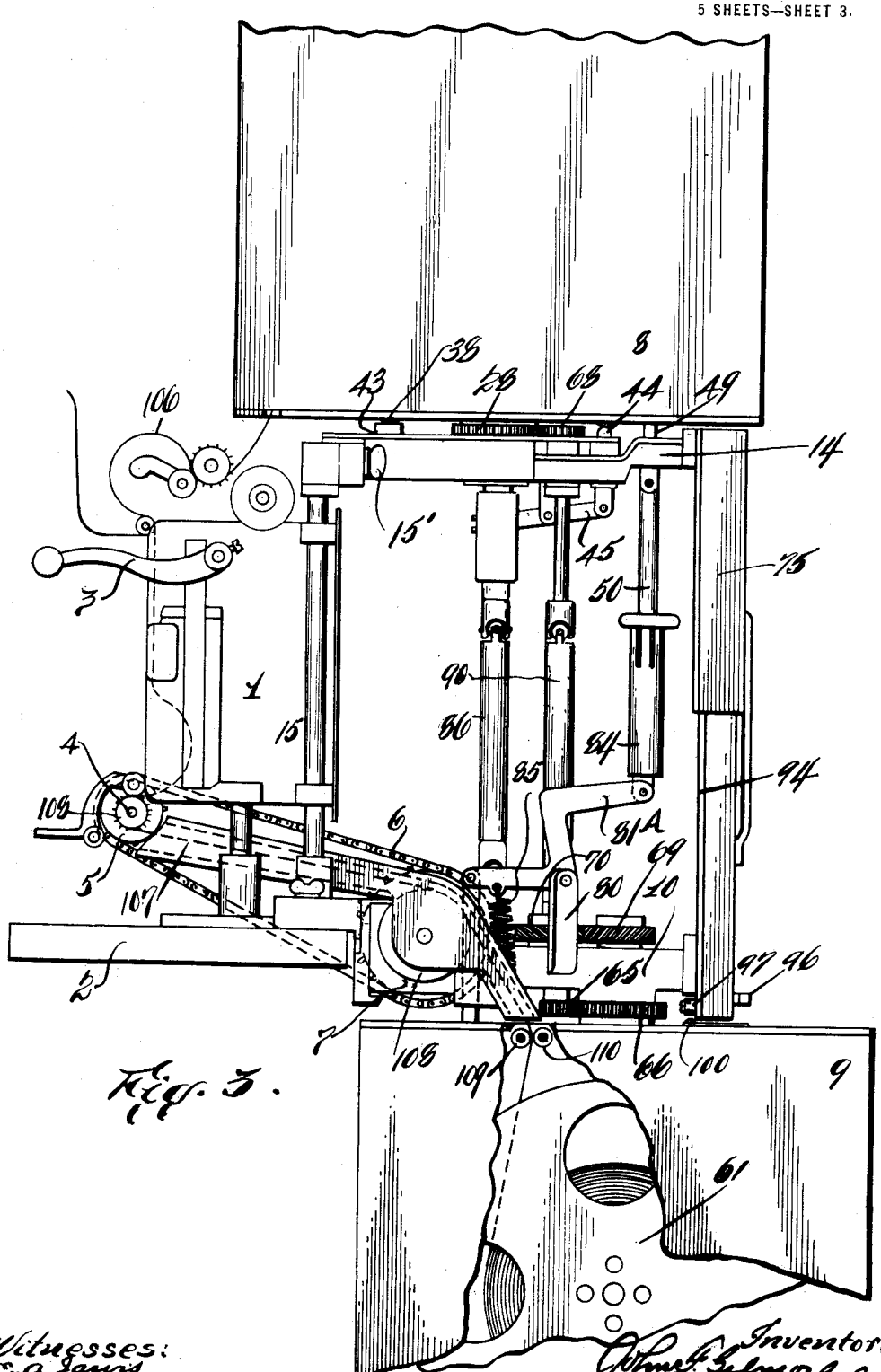
Fig. 3 is a side elevation of the device partly broken away, showing the device as attached to a projecting machine.

In operation, a film is first inserted on the left hand of the device as shown in Fig. 1, and threaded through the machine in the ordinary manner indicated by the line 106, Fig. 3, then through a practically closed channel 107 on an angle, and over a roller 108 to the two rollers 109—110 mounted on a lower box, and there secured to an empty reel, which, as shown in Fig. 2, is free from the friction cup 76, but is under the influence of rotation of the shaft 62. A friction device, such as shown in my co-pending application hereinbefore referred to, is provided between the beveled pinion 58 and the reel, and subject to such friction the reel begins to rotate with the operation of the lever 3, and the film is pulled through the machine, only retarded by such friction as exists by the friction disk 33 in the upper box tending to retard its reel. When such film is completely shown, and wound on the lower reel 60, the operator will lift the pin by grabbing the part marked A. He will then partially rotate the two boxes, place a new film in the opposite side of the upper box, thread the already used film up between the rollers 40, and 41, and on to the other reel of the upper box. He will then complete a half revolution of the boxes by turning either box by hand until the registering pins again fall into place, during which rotation the latch of the cover 94 of the channel will have been snapped into place to protect the film which has moved into place in said channel, whereupon the operator will thread the new film down through the machine, and on to the other reel in the lower box. Now on operation of the handle 3 one of the reels will be driven to pull the film down as is usual in the lower box and the other lower box reel will be free for rotation, excepting such retarding action as the friction clutch 76 may put upon it, while in the upper boxes, the reel being shown, will be frictionally retarded and the other reel driven by the shaft 25. In the event that the film being rewound should break, the portion 36 will immediately disengage the clutch 48, and render the shaft 25 inert, so that no further rotation will be given to either the rewinding reel or the reel being unwound, which has already been projected.

In carrying out this invention, details of construction may be varied from those shown, and yet the essence of the invention be retained; some parts might be employed without others, and new features thereof might be combined with elements old in the art in diverse ways, although the herein described type is regarded as embodying substantial improvements over such modifications.

As many changes could be made in the above construction, many apparently widely different embodiments of the invention could be made without departing from the scope thereof, it is intended that all matter contained in the above description or shown in the accompanying drawings shall be interpreted in an illustrative and not in a limiting sense.

It is furthermore desired to be understood that the language used in the following claims is intended to cover all the generic and specific features of the invention herein described, and all statements of the scope of the invention which as a matter of language might be said to fall therebetween.

I claim as my invention:

1. In combination with a film winding device mounted on a motion picture apparatus, consisting of two revoluble reel supports for a plurality of reels, locking devices on the supports, connected with each other by a bar and levers, to operate the locks simultaneously on both supports and to maintain the supports in parallel alinement with the optical axis of the motion picture apparatus.

2. In combination with a motion picture apparatus a film winding device consisting of two revoluble reel supports each for a plurality of reels, a stationary film channel between the supports, a spring door on said channel, a projection on said door and a projection on at least one of said reel supports, adapted to engage the projection on the door when said reel support is being revolved, thereby opening the door of the channel to receive a film at and during a predetermined period.

3. In combination with a film winding device having a plurality of revoluble reel supports each for a plurality of reels above and below the optical axis of a motion picture apparatus, a stationary film channel between the supports, a door on said channel held in closed position by a spring, and a projection on the door, and a projection on the revoluble reel support, said door being operated automatically by revolving of the reel supports as the projection on the revoluble support engages the projection on the door of the channel.

4. In combination with a film winding device having a plurality of reel supports for a plurality of reels, driving means for the reel supports, a device controlled by the film to engage and disengage the driving means of a reel automatically, said device consisting of a movable lever mounted in the support and in contact with a film, said lever being operatively connected with a clutch mounted between the driving means and the reels in the support.

Signed at New York city this 26" day of May 1913.

JOHN F. GILMORE.

Witnesses:
MABEL DITTENHOEFER,
FRED F. WEISS.